United States Patent Office 3,016,351
Patented Jan. 9, 1962

3,016,351
PROCESS FOR IMPROVING SECONDARY
OIL RECOVERY
Frederick A. Hessel, Montclair, N.J., and Francis J. Prescott, Flushing, N.Y., assignors to General Aniline & Film Corporation, New York, N.Y., a corporation of Delaware
No Drawing. Filed Oct. 30, 1959, Ser. No. 849,757
2 Claims. (Cl. 252—8.55)

This invention relates to the secondary recovery of petroleum by the water flooding method and more particularly is concerned with the treatment of water input wells for the purpose of facilitating the injection of flood water into an oil reservoir.

Oil exists in well sands or similar strata in two different states, i.e., as free oil that is located in the voids of the sand and as fixed oil which is held by absorption (and perhaps to some degree by adsorption) on the particles of sand and which is commonly referred to as the film of oil that adheres to the particles of sand or the particles of the oleiferous structure. Such fixed oil may be said to be held by "sorption."

Free oil can be recovered by conventional methods of oil producing such as draining the oil in conjunction with liquid or gaseous pressure and creating an artificial fluid or gaseous pressure in the sand bed so as to dislodge the oil from the sand bed and thereafter conduct the dislodged oil to the surface of the ground. Fixed oil, on the other hand, cannot be recovered by any of the conventional methods or means used to produce oil and cannot be dislodged economically either by fluid or gaseous pressure. In some cases, the amount of oil remaining in the well after pumping has become unprofitable may equal 60 percent of the original oil present.

The water flooding of underground oil-bearing formations has been widely used for increasing the recovery of oil from the formation. This procedure involves the injection of water or brine into the input wells to force oil through the surrounding formation toward output wells from which it can be recovered. The success of the water flooding operation manifestly depends upon its total cost being less than the value of the additional oil recovered from the reservoir.

A substantial factor in the economics of water flooding is the cost of pumping the water into the formation. In many cases pumping costs may be too high to permit this secondary recovery method to be employed successfully. This is occasioned by unduly low rates of water injectivity into the formation for a given pump pressure, which necessitates the use of excessively high pressures to force the water into the formation at the desired rate. When this condition prevails, a conventional flooding operation cannot be practiced economically.

The present invention is directed to a method of treating an input well so that the water injectivity rate can be substantially increased for a given pump pressure level.

According to the invention, the formation adjacent the input well is treated by means of a very slightly water miscible polymethoxy acetal of the general formula

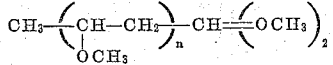

wherein $n$ is an interger of from 1 to 15. We have found that when such compound is used to treat the formation surrounding the input well base, a substantial increase in the injectivity rate of water or brine solution is effected.

The polymethoxy acetals employed in the present invention are well known in the art and can be made by the reaction of methanol with methyl vinyl ether under anhydrous conditions in the presence of an acid condensing agent. As described in U.S. Patent 2,000,252 of May 7, 1935 to Reppe, 1 mole of methyl vinyl ether will react with 1 mole of methanol to form dimethyl acetal, as is illustrated in the following equation:

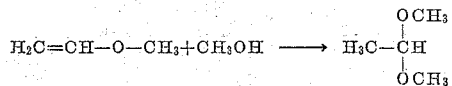

which will then react with additional methyl vinyl ether and form polymethoxy acetals as described in U.S. Patent 2,165,962 to Mueller-Cunradi et al. and as illustrated in the following equation

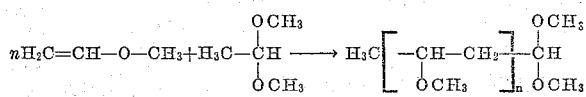

Polymethoxy acetals of varying molecular weight can thus be obtained depending on the relative amount of methyl vinyl ether employed. We particularly prefer, for purposes of the present invention, the mixed acetals obtained by reaction of about 6 molar proportions of methyl vinyl ether with 1 molar proportion of methanol, i.e. products where $n$ in the above formula is an integer having an average value of about 5. While for obvious economic reasons, the mixture of acetals obtained by reaction of methyl vinyl ether and methanol as described in the above mentioned patents are preferred, it should be understood that by careful fractional distillation, or other methods known in the art, the individual components of such mixtures may be isolated in pure form and such individual components are equally operative for use in accordance with this invention. Once again, the pure products in which $n$ is about 5 are particularly preferred.

The mixed polymethoxy acetals obtained by the reaction of methanol and methyl vinyl ether are commercially available and properties of typical commercial products in which $n$ in the above formula is an integer having an average value of 5, 10 and 15 respectively, are given in the following table:

| | Average Value of $n$ in Formula | | |
|---|---|---|---|
| | 5 | 10 | 15 |
| Specific Gravity, 25/4° C | 0.978 | 1.015 | 1.021. |
| Weight per gallon, lbs. at 63° F | 8.19 | 8.50 | 8.54. |
| Pour Point, ° F | −55 | 5 | 15. |
| Flash Point, ° F. (open cup) | 255 | 330 | 310. |
| Refractive Index $n_D^{25}$ | 1.440 | 1.453 | 1.456. |
| Appearance | Clear yellow. | Hazy yellow. | Hazy yellow. |
| Odor | Ethereal | Ethereal | Ethereal. |
| Initial Boiling Point, ° C | 140 | 220 | 230. |
| Comparative Hydroscopicity (Glycerol=100) 70 R.H. and 70° F. | 0 | 4 | 11. |
| Solubility in Ethyl Alcohol and Ethyl Ether. | Completely Soluble. | Completely Soluble. | Completely Soluble. |
| Typical Viscosity Values 25° C., centistokes. | 15 | 325 | 980. |

The ability of the polymethoxy acetals to increase the injectivity rate of water or brine into an oil bearing formation was demonstrated in the following manner.

Four core samples of an oil bearing sand, after primary recovery, obtained at approximately 1300 ft. from the Bartlesville Sand in Washington County, Oklahoma were obtained. These core samples had the following properties:

| Sample Number | Permeability, Md. (Millidarcies) | Porosity (percent) | Percent Saturation |||
|---|---|---|---|---|---|
| | | | Oil | Water | Total |
| Core No. 1 | 38 | 17 | 32 | 44 | 76 |
| Core No. 2 | 42 | 17.5 | 36 | 43 | 79 |
| Core No. 3 | 35 | 17 | 30 | 42 | 75 |
| Core No. 4 | 40 | 17.5 | 35 | 45 | 80 |

A simple mounting provided means for flooding the surface of the cores. The samples were treated as follows:

Cores #1 and 2 were treated respectively with 10 cc. of water, and 10 cc. of an Arbuckle Lime brine (obtained from K & S Project Oil Recovery Corp., Miller WSW #1 Well, Township 27 North, Range 13 East, N.W. quarter of Section 5, Washington County, Oklahoma), while Cores #3 and 4 were first treated with 2 cc. of polymethoxy acetals of the formula

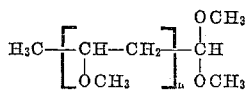

wherein $n$ is an integer having an average value of 5, followed 15 minutes later by 10 cc. of water in Core #3 and 10 cc. of the brine in Core #4.

The number of minutes for the absorption of water or brine into the cores may be tabulated as follows:

Core #1 with water_____ Not absorbed in 1 hour.
Core #2 with brine_____ Do.
Core #3 water+PMAC_____ 15 minutes.
Core #4 brine+PMAC_____ Do.

It is quite evident from the above data that PMAC which is only very slightly soluble in water has nevertheless the ability to increase materially the injectivity rate of water or brine in an oil bearing formation. It is well known that an increase in water put through a given formation helps materially in the recovery of oil.

The following specific example will further illustrate the use of the present invention.

A water input well in an oil bearing formation, being subjected to a water flooding operation, located at a depth of about 1300 feet and having a thickness of 35 feet of oil bearing sand was selected. Core studies showed that the formation had an average porosity of 17 percent, an air permeability of about 40 millidarcies and a residual oil content of .36 percent. Prior to treatment, the rate of pumping water into this input well was about 200 barrels per day. The formation was then treated by pumping thereinto through the water input well 20 gallons of polymethoxy acetal of the formula

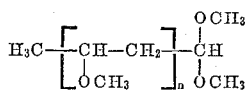

wherein $n$ is an integer having an average value of 5. The pumping of flood water into the formation through the input well then resumed at the same pumping pressure with the result that the injection rate was more than double that obtained prior to treatment.

It is not known why treatment with the types of compounds above described will substantially increase the permeability of an oil bearing formation to water or the injectivity rate of water or brine into the input wells. One possible explanation is that the polymethoxy acetals in some manner help to move the droplets of residual oil that otherwise would not flow through the formation. By flowing this residual oil away from that portion of the formation adjacent to the bore hole of the input well, the resistance to water flow is considerably reduced and the injection of water is correspondingly facilitated. Once the removal of the residual oil from the immediate vicinity from the bore hole has been accomplished, the resistance to flow of water will remain low during further injection of water or brine. It should be understood, however, that we do not limit ourselves to this theory of operation.

We claim:

1. In the secondary recovery of petroleum from an underground formation by the water flooding method wherein water is injected through an input well into an underground oil bearing formation to force oil through such formation toward output wells from which oil is withdrawn, the step of increasing the injectivity of flood water into an input well, which comprises introducing through the input well into the adjacent formation a slightly water miscible polymethoxy acetal of the formula

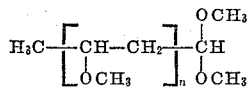

wherein $n$ is an interger of from 1 to 15.

2. The method according to claim 1, wherein the polymethoxy acetal employed is one in which $n$ in the formula given is an integer having an average value of about 5.

References Cited in the file of this patent

UNITED STATES PATENTS

| 2,165,962 | Mueller-Cunradi et al. | July 11, 1939 |
| 2,262,428 | Lietz | Nov. 11, 1941 |
| 2,905,718 | Benneville et al. | Sept. 22, 1959 |

OTHER REFERENCES

Orco Pins Hopes on Carbonated Flood, article in The Oil and Gas Journal, Sept. 2, 1957, pages 88 and 89.